(12) United States Patent
Booth

(10) Patent No.: US 7,000,220 B1
(45) Date of Patent: Feb. 14, 2006

(54) NETWORKED SOFTWARE DEVELOPMENT ENVIRONMENT ALLOWING SIMULTANEOUS CLIENTS WITH COMBINED RUN MODE AND DESIGN MODE

(76) Inventor: Thomas W. Booth, 2260 W. 5320 South, Taylorsville, UT (US) 84118

( * ) Notice: Subject to any disclaimer, the term of this patent is extended or adjusted under 35 U.S.C. 154(b) by 654 days.

(21) Appl. No.: 10/077,512

(22) Filed: Feb. 15, 2002

Related U.S. Application Data

(60) Provisional application No. 60/269,194, filed on Feb. 15, 2001.

(51) Int. Cl.
*G06F 9/44* (2006.01)

(52) U.S. Cl. .................. 717/110; 717/103; 717/126

(58) Field of Classification Search ........ 717/100–103, 717/110, 126; 709/201–205
See application file for complete search history.

(56) References Cited

U.S. PATENT DOCUMENTS

| | | | | |
|---|---|---|---|---|
| 4,558,413 | A | * | 12/1985 | Schmidt et al. ............ 707/203 |
| 5,220,657 | A | * | 6/1993 | Bly et al. .................... 711/152 |
| 5,301,270 | A | * | 4/1994 | Steinberg et al. ........... 715/866 |
| 5,446,842 | A | * | 8/1995 | Schaeffer et al. ........... 709/205 |
| 5,583,993 | A | * | 12/1996 | Foster et al. ................ 709/205 |
| 5,596,702 | A | | 1/1997 | Stucka et al. ............... 715/746 |
| 5,781,732 | A | * | 7/1998 | Adams ........................ 709/205 |
| 5,845,299 | A | | 12/1998 | Arora et al. ................. 715/513 |
| 6,047,288 | A | | 4/2000 | Kurosawa et al. ............. 707/9 |
| 6,125,385 | A | | 9/2000 | Wies et al. .................. 709/203 |
| 6,247,020 | B1 | | 6/2001 | Minard .................... 707/104.1 |
| 6,332,163 | B1 | | 12/2001 | Bowman-Amuah ......... 709/231 |
| 6,334,141 | B1 | * | 12/2001 | Varma et al. ............... 709/205 |
| 6,336,134 | B1 | * | 1/2002 | Varma ........................ 709/205 |
| 6,378,001 | B1 | * | 4/2002 | Aditham et al. ............ 719/313 |
| 6,598,094 | B1 | * | 7/2003 | Wollrath et al. ............ 719/330 |
| 6,678,882 | B1 | * | 1/2004 | Hurley et al. ............... 717/121 |
| 6,845,390 | B1 | * | 1/2005 | Jorgenson et al. .......... 709/205 |
| 2004/0158812 | A1 | * | 8/2004 | Dye et al. ................... 717/105 |

* cited by examiner

OTHER PUBLICATIONS

J. P. Munson and P. Dewan, "Sync: A Java Framework for Mobile Collaborative Applications", IEEE, vol. 30, No. 6 (Jun.), pp. 59-66, 1997.*

*Primary Examiner*—Anil Khatri
*Assistant Examiner*—Trenton J. Roche
(74) *Attorney, Agent, or Firm*—Booth Udall, PLC

(57) ABSTRACT

A software application development system and method of developing and running software is disclosed that allows multiple developers to access, develop and run a common software application simultaneously; even while others are running and using the same software application. In a first aspect of the invention, a software development environment includes combined run mode and design mode functions and code which allow a user to seamlessly toggle between run mode and design mode without compiling or otherwise converting the software application. This is accomplished through the use of common properties tables in both the run mode and the design mode for the application. In a second aspect of the invention, multiple clients of a software application server are each able to develop, run, and otherwise interact with a software application at the same time from different computers so that each modification by each client is reflected immediately in the software application running on each other client. Thus, multiple users can use and develop the same software simultaneously through update notices between the clients and the server. This aspect of the invention allows a software application to be developed and tested by multiple users through a network while a customer is running and commenting on the application from a remote location. Several specific uses for embodiments of the invention are also described.

30 Claims, 7 Drawing Sheets

NETWORKED SOFTWARE DEVELOPMENT ENVIRONMENT ALLOWING SIMULTANEOUS CLIENTS WITH COMBINED RUN MODE AND DESIGN MODE

This application is related to U.S. Provisional Patent Application Ser. No. 60/269,194, filed on Feb. 15, 2001, entitled "PARALLEL APPROACH TO SOFTWARE DEVELOPMENT". The disclosure of this related application is incorporated herein by this reference.

BACKGROUND OF THE INVENTION

1. Technical Field

This invention relates generally to the field of software development environments and specifically to a development environment that allows multiple clients to simultaneously access, edit and otherwise develop the same application, even while the application is being used. The invention also specifically relates to a software development environment that combines the run mode and the design mode of the environment so that software may be developed and run simultaneously without the need for intermediate conversions or compiling.

2. Background Art

The conventional software development process involves a number of required sequential steps each performed by a different development group member; each step being dependent upon the preceding steps to define a critical path in the software development timeline. Because the steps are sequential and dependent upon preceding steps, conventional software development processes are relatively long. If a preceding step is not complete or is completed incorrectly for whatever reason, such as insufficient communication between development group members, the subsequent steps must be postponed until the previous steps are correctly completed.

One example of a typical software development project may involve a company with a need for software. The software concept is explained to the project manager, who explains the concept to a layout designer, who lays out the concept for a graphics designer and explains the data requirements, which are based on the layout design, to the data definition designer. All designers then explain their portion of the design to the programmer who attempts to merge the designs into the actual implementation of the software application so it can be tested for problems by the testing staff. The problems reported by the testing staff as well as design changes by the project manager are reported to the appropriate designers so that corrections can be made effectively starting the cycle over again. Even when the software development team believes the software is done, the client may then still have changes and the process begins again. Software development processes which use linearly dependent development steps require significant development time. Even if there were unlimited resources for a software development project, the development process would still need to go through those steps.

To shorten the overall time required for software development, others have used what is commonly called Rapid Application Development (RAD) methods to shorten the time required for each step in the process. Examples of RAD techniques include Graphical User Interface (GUI) layout design tools, visual data layout design tools, as well as others. These methods shorten the time required within a particular step, but still require the linear dependencies previously experienced. "Visual" development environments, such as Borland's Delphi™, Microsoft® Visual Basic, Microsoft® J++ and Powersoft's PowerBuilder™, are becoming preferred development tools for quickly creating production applications. The RAD approach has been successful to some extent because the process has been made faster. However, the linear dependencies still exist. Ultimately, each step still requires, and is limited to, a single user sitting at a single computer to perform the step, and any single computer only accepts input contributing to the step from one keyboard and one mouse at a time.

DISCLOSURE OF THE INVENTION

The present invention relates to a software application development environment and methods of developing, running and updating software applications. In a first aspect of the invention, the run mode and design mode of a software application are combined into a common development application so that a developer can develop a software application and immediately test the operation of the developed features without compiling or otherwise converting the application into another form. During both the developing and the running of the software application a common set of definition tables are used to define how the application appears and behaves in run mode. The use of common tables allows the application to be run simultaneously in run mode and in development mode, and allows a user to switch between the two without the need to compile or otherwise convert the application. In this way, parallel sets of software code for the development environment allow a developer to select between run mode or design mode by the mere activation of a development switch such as an Alt key.

In a second aspect of the invention, multiple developers and other users ("user") can simultaneously access and run the same software application, and any changes to the software application by a user is reflected to every other user accessing the same software application. When a user desires to run or develop a software application, the user, through a client to a software application server containing the desired software application, requests and receives a copy of the software application from the software application server and executes or "runs" it on the client. Any modification or addition to any aspect or property of the application by the user is reflected in a table associated with the software application on the client. As used herein, "property" refers to anything in the software that defines the appearance or behavior of the software. The table cells may be subindexed even down to the byte level to reference very specific modifications for updates rather than generally replacing an entire table. The client then sends notice to the software application server of the modification and the software application server makes the modification to the corresponding table associated with the software application stored on the server. The software application server then sends notice to its clients of the update. Similarly, when a client receives an update notice from a software application server that a modification has been made to a property of the application, it updates the corresponding table associated with the copy of the application on the client. In this way, modifications to any copy of the software application are immediately updated on other clients referencing the software application server.

Embodiments of the invention enable a reduction in the start-to-finish time required for developing software. Any number of developers and users may simultaneously develop, run, and test the same software application without interrupting the use or development of the application by anyone else. Updates to software applications may be done without having users exit the applications while changes are being made. Backup processes for software applications as well as any other files designed using the development processes of the invention may be automated and kept constantly updated by maintaining a running software application or file on a backup server. A common text document or other file may also be modified and discussed jointly by multiple users on different computers.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Embodiments of the present invention relate to a software environment that is managed by and available on a server. A "server" is any application, software, program or hardware equivalent which provides data to other software, application, program or hardware equivalent. "Server" may be used to refer either to the software running on a computer, or to the computer itself. A "client" is the application, software, program or hardware equivalent which receives the data from the server. A client may be included on the same computer as the server, such as in a different portion of memory, or may be remotely communicating with the server such as through a local area network (LAN), a wide area network (WAN), a global area network (i.e. the Internet), wired or wireless communication, or any other communication means known in the art.

As used herein, "software", a "software application" or an "application" is intended to include any software, program or application, with or without a user interface, including, for example, any executable, support files, library files, data tables, picture files, sound files, animation files and the like, used to accomplish a desired function or to generate an environment within which a client may perform any number of designated tasks. For example, the software package Microsoft Word™ produced by Microsoft Corporation of Oregon, including all files that are included with the package, is one example of a software application. The relationships and operations between servers and clients are well known in the art.

Figure 1:
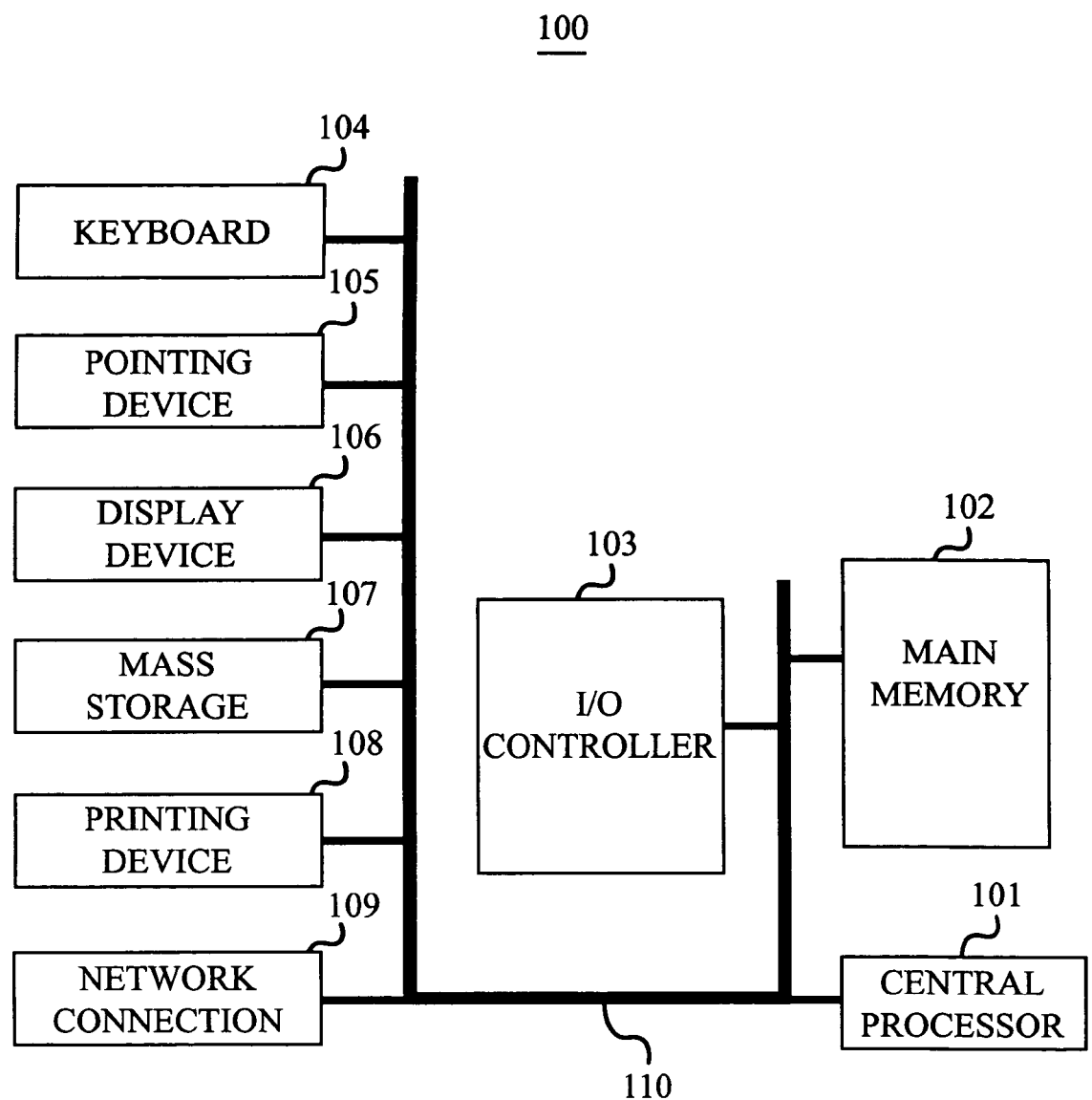
FIG. 1 is a block diagram of a computer system in which the present invention may be embodied.

Embodiments of the present invention may be run on a computer system such as the system 100 shown in FIG. 1, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM or DVD-ROM), and the like). Additional input/output devices, such as a printing device 108 and a network connection 109, may be provided with the system 100 as desired or required for embodiments of the invention. As shown, various components of the system 100 communicate through a system bus 110 or similar architecture. In a particular embodiment of the invention, system 100 includes an IBM-compatible personal computer available from a variety of vendors (including IBM of Armonk, N.Y.). Embodiments of the present invention may involve development of software applications on a single system 100, or may involve a plurality of systems 100 networked together through conventional means.

Figure 2:
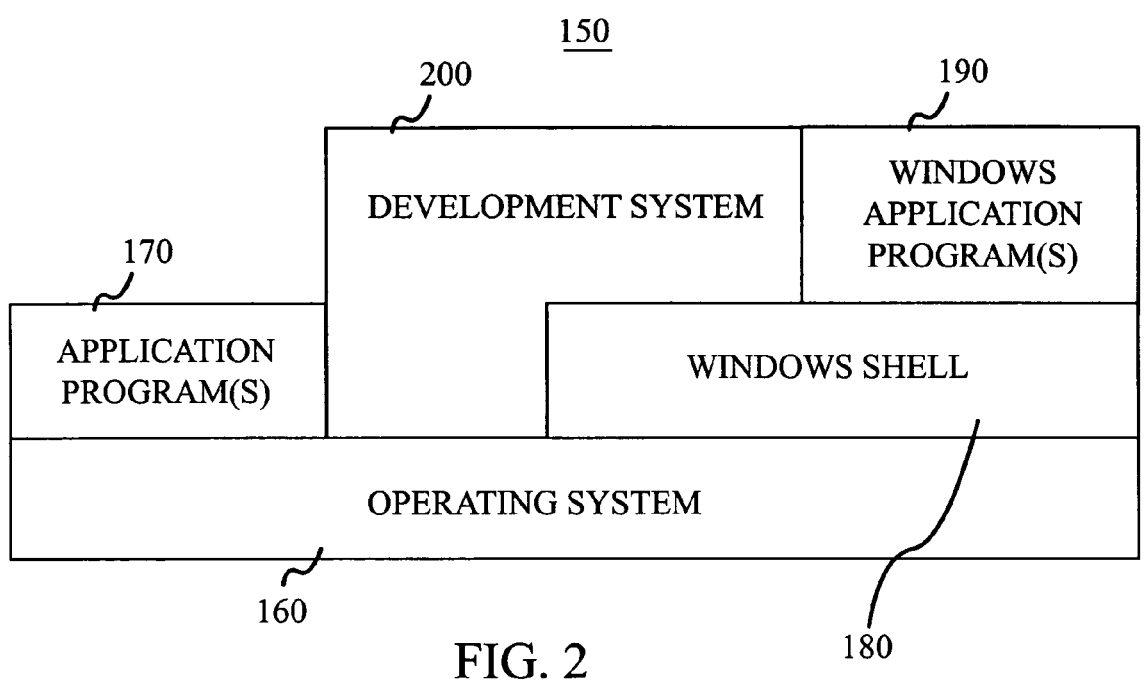
FIG. 2 is a block diagram of a software system for controlling the operation of the system of FIG. 1.

FIG. 2 illustrates an example of a computer software system 150 which may be used for directing the operation of the computer system 100 of FIG. 1. Simpler and more complex examples of applicable computer software systems will be clear to those of ordinary skill in the art. Software system 150, which is stored in system memory 102 (FIG. 1) and/or on disk storage 107 (FIG. 1), includes a kernel or operating system (OS) 160 and a windows shell or interface 180. One or more application programs, such as application programs 170 or windows applications programs 190, may be "loaded" (i.e. transferred from storage 107 into memory 102) for execution or "running" by the system 100 (FIG. 1). OS 160 and shell 180, as well as application software 170 and 190, include an interface for receiving user commands, data and other useful information and interaction, and for displaying results and other useful information. Software system 150, depending upon the purpose of the computer system 100 of a particular embodiment, may also include a development system 200 or other region of the system 150 for running a software application being tested or under development. As shown, the development system 200 may include components which interface with the system 100 (FIG. 1) through windows shell 180, as well as components which interface directly through OS 160.

In a particular embodiment, operating system 160 and windows shell 180 are provided by Microsoft® Windows 2000/Windows NT, available from Microsoft® Corporation of Redmond, Wash. Those skilled in the art will appreciate that the system may be implemented in other platforms, including Macintosh, UNIX, and the like. Application software 170 and 190 may include any one of a variety of software applications, such as word processing, database, spreadsheet, text editors, and the like, including those created by or being developed through the development system 200.

Figure 3:
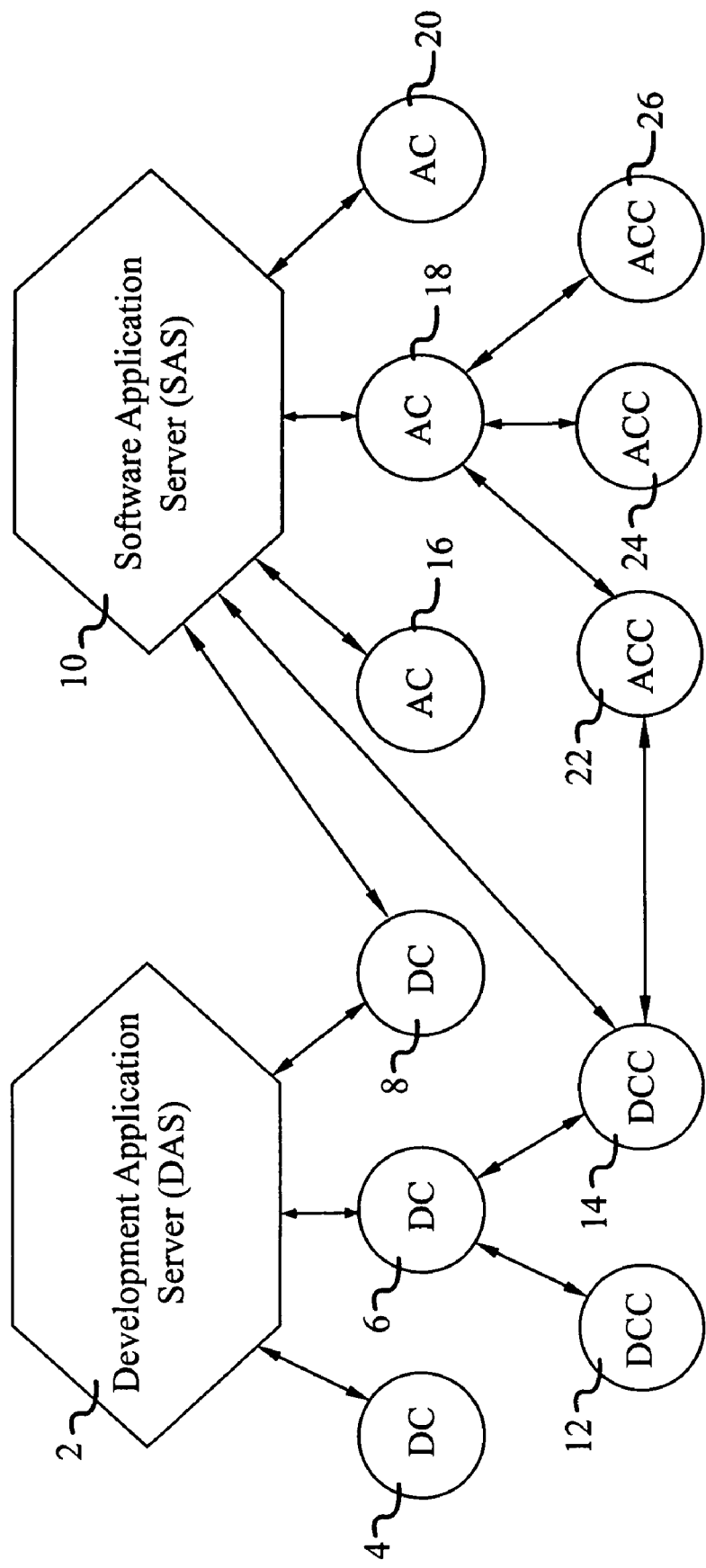
FIG. 3 is a block diagram of the general relationships between servers and clients of an embodiment of the present invention.

FIG. 3 illustrates a Development Application Server ("DAS") 2 that includes a software development application which, when running, defines an application development environment. Application development environments in general, are known in the art. One particular example is Visual Basic, produced by Microsoft® Corporation of Oregon. While conventional development applications allow only a single client to develop a particular part of an application at a time, embodiments of the present invention allow any number of development clients ("DC") to establish parallel development environments simultaneously and to simultaneously develop the same parts of a software application.

Figure 4:
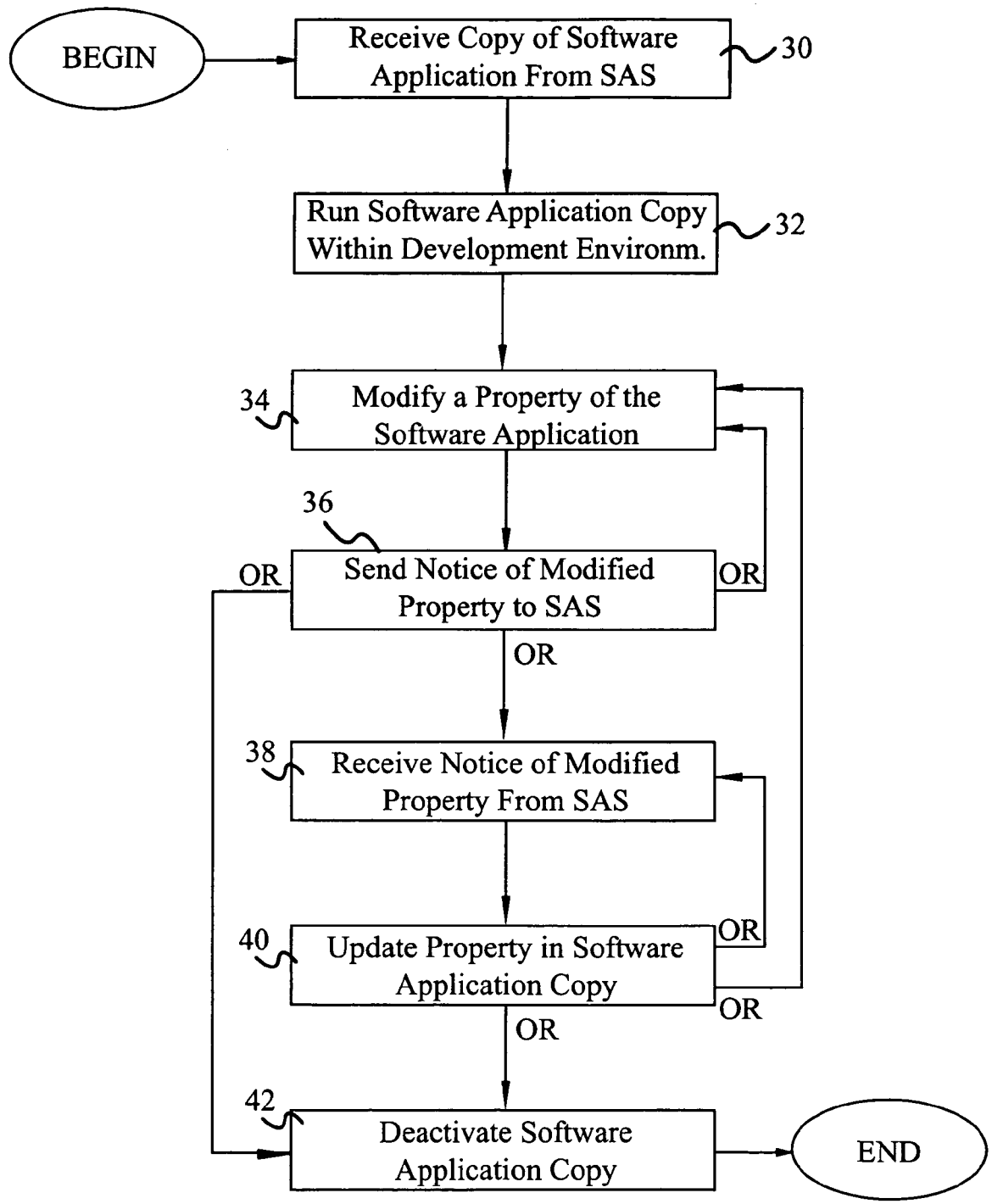
FIG. 4 is a flow chart of a method of developing software from the view of a development client or development application server according to an embodiment of the present invention.

In reference to FIGS. 3 and 4, in embodiments of the present invention, a DC 4, 6 or 8 is provided with an executable file which, when executed, requests a copy of the development application from the DAS 2. The DAS 2 then transmits a copy of the development application environment to the requesting DC 4, 6 or 8, which executes on the DC 4, 6 or 8 and enables the DC 4, 6 or 8 to develop applications within the development environment defined by the executed development application copy. Alternatively, it is contemplated that each of DC 4, 6 and 8, may include its own independent development application so long as the independent development application, or a separate application running on the DC with it, is configured to provide, receive and respond to the update notices described later herein. Once the DC 4, 6 or 8, has a development application running, it may then associate with or "point to" a Software Application Server ("SAS") 10 that has an application to be developed (for example DC 8), or otherwise create a new application and "point to" a location for storing the new application for developing. As used herein, the term "develop" refers to creating, modifying and defining data, controls, displays, functionality, and the like, which define what the application that is being developed will look like, how it will behave, and in what form and where the application and associated data will exist. Developing may involve creating and associating appropriate data and files associated with an application.

Once the DC 4, 6 or 8 is operating with a development environment and has selected an application to develop, it requests and receives a copy of the application (Step 30 of FIG. 4) from the SAS, and executes or "runs" the software application within the development environment (Step 32 of FIG. 4). Within the development environment, properties, such as those relating to the visual controls, of the software application may be modified or otherwise developed (Step 34 of FIG. 4). Because the DC 4, 6 or 8 is developing a copy of the software application, its changes are first applied to the properties associated with the copy of the software application on the DC, and second to the properties associated with the software application on the SAS 10. Updates are sent to the SAS 10 every time a property of the software application copy on the DC is modified (Step 36 of FIG. 4). When the SAS 10 receives a notice of a modified property from any source, such as a DC 4, 6 or 8, the SAS 10 modifies the properties associated with the software application on the SAS 10 to reflect the property modification made by the DC, and sends a notice to all clients of the SAS 10 to give notice of the modification.

When a DC 4, 6 or 8, receives a notice of a modification from an SAS 10 (Step 38 of FIG. 4), the DC similarly modifies or otherwise updates the properties associated with the software application copy on the DC to reflect the property modification notice provided by the SAS 10 (Step 40 of FIG. 4). When a developer or other user interacting with a client no longer desires to interact with the software application, the user may so indicate and deactivate the software application copy on the DC (Step 42 of FIG. 4). Deactivation may involve a number of different actions such as disconnecting or shutting down the software application running on the client, deleting the copy of the software application from the memory of the client, or merely removing the software application from the active memory of the client. The software application copy may remain in the memory of the DC, and copied over or simply discarded the next time a copy is received from the SAS.

Because updates to the software application are maintained on the SAS 10, and others may have made changes to the software application through other DC's since it was developed at a particular DC, it may be beneficial to verify version information to determine if a new copy of the of the software application must be requested or if the existing version of the software application can be used, at the beginning of each development session. To assist with this, time identifiers for modifications may be associated with each update notice to ensure that a client which was disconnected, such as during a power outage, or is working offline, has received the appropriate updates and has the most recent version of the changes.

One particularly unique aspect of the invention is that the run mode and the design mode of the software application are combined. In conventional application development, the design of an application or a portion of an application is refined in the design stages and then is created in the implementation stages. However, before the application may be tested by a separate person or by the programmer himself, the application must be converted into a form in which a processor is able to cause the application to function as it was designed, such as by compiling the program. For conventional application development, the application cannot run or even be tested without this conversion into a runtime form.

Figure 5:
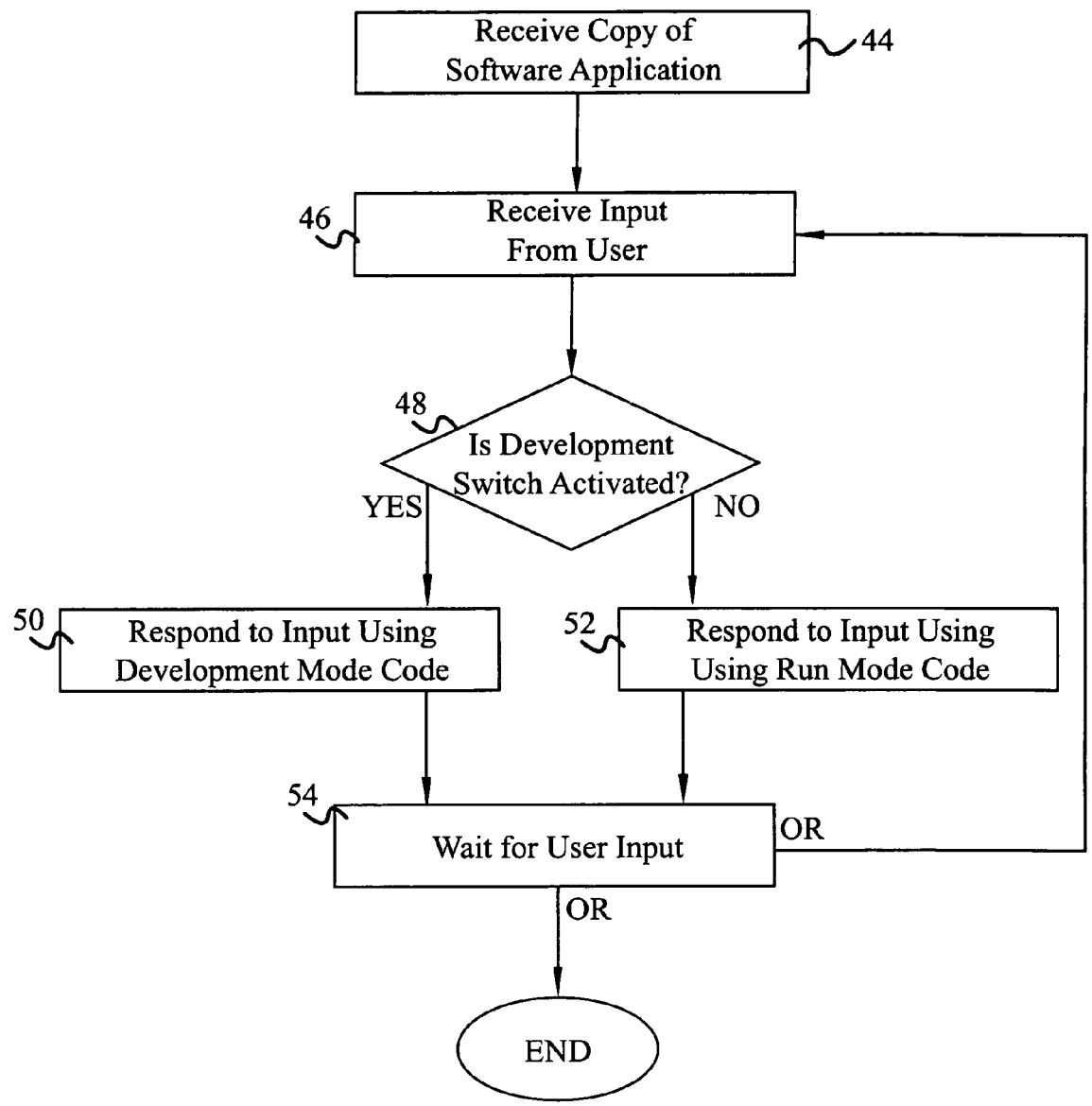
FIG. 5 is a flow chart illustrating the operation of a development environment having a combined run mode and design mode according to an embodiment of the present invention.

In embodiments of the present invention, applications may be designed, also called "developed", and run without converting or compiling the software application into another form. By specific example in reference to FIG. 5, if a user is running a software application (Step 44) within a design environment and desires to interact with the software application, for example to modify the appearance or behavior of a portion of the application, the user may provide input to the software application (Step 46). At that point, the development environment determines whether or not a development switch has been activated (Step 48). If the switch is activated when the user interacts with the software application, for example by activating or deactivating a command key, such as the Alt key or any other hardware or software control ("control"), the software application responds to an input using functionality associated with a design mode (Step 50), allowing development to be done on the software application. If the control is not activated when the user interacts with the software application, the software application responds to an input using code associated with a run mode (Step 52). Thus, the response of the software application to each input from the user will be a run-response or a design-response, depending on the state of the above mentioned development switch. Programmers of ordinary skill are well versed in associating code commands with contingent events in any number of different ways depending upon the programming language used. In addition to taking other steps, the software application then waits for input from the user (Step 54) to evaluate which type of response should be performed depending on the state of the development switch.

By specific example of an embodiment of the invention, in development mode, (i.e. the development switch is activated) using a visual development application, a user may drag and drop a text box to a location on the screen and then resize the borders of the text box to set it at an appropriate size. The text box as well as the other visual controls are programmed check the state of the development switch before it reacts to any user interactions. A control is programmed to only respond to the user's interaction with a development response if the development switch is activated. Likewise, a control is programmed to only respond to the user's interaction with a runtime response if the development switch is not activated. For example, a runtime response for a click on a text box may display a blinking vertical line signifying that the text box is ready for the user to enter text. The user could then proceed to type text into the text box. A development response to even simply moving the mouse over the text box would perhaps show arrows on the control specifying how the text box could be resized or repositioned. With the development switch still activated, the developer may proceed to resize or reposition the text box. The moment the development switch is deactivated, the user can no longer resize or reposition the control or modify any other properties associated with the control. Selecting the text box again only enables the user to type information into the text box to be stored in an associated data table or other data storage location. Instead of a single development switch, or command key, additional functionality may be achieved through a plurality of command keys or controls on a keyboard, such as the function keys on a standard keyboard, a control bar or pad separate from the keyboard, such as a mouse or design board, or a virtual control bar or pad on the computer display to enable a particular set of commands in response to user interaction with the development environment or application.

A particular example of how to enable simultaneous run and design functionalities of the environment is by using a common set of definition tables. For example, using the text box example from above, when the text box is developed as described, the properties for the text box, and any other visual controls developed, are stored in a properties definition table for the application having a row associated with the text box, and a cell for each property of the text box. Another cell within a different table contains the information entered into the text box during run mode. During run mode, the same properties definition table is used to define the visual control properties as is defined during design mode. The same tables may be used simultaneously for both run and design functionality with no conversion or modification to change between the two.

A "visual control" is any button, text box, tree view, scroll bar, splitter window, picture, graph, chart, table, list box, combo box, label, check box, option button, and the like, including all programmable elements graphically displayable on a display, which define the development parameters. The properties or attributes of visual controls may include any number of properties defining the visual control, but include such properties as, without limitation, width, height, position, color, boarder, font, response to interaction, and anything else that defines how the visual control will appear or behave. Application programmers of ordinary skill in the art are familiar with the creation and properties associated with visual controls for applications. For example, U.S. Pat. No. 6,247,020 to Minard (issued Jun. 12, 2001) includes a description of rapid application development and one conventional method for creating and associating properties with visual controls for applications. Other methods will be clear to those of ordinary skill in the art.

The software application developed as described above, using combined run mode and design mode, is ready to ship to customers for use as designed without any further conversions, compiling or modifications immediately after the developer determines the software application is complete within the development environment. In one particular embodiment of the invention, however, once the application is completely developed and ready for shipping to an end customer, the additional development functionality enabled by a development switch may be disabled by adding one or more simple commands to the appropriate application code to remove the development functionality. This gives an application developer the ability to limit how its customers may modify the application, or prevent a customer from accidentally modifying the application. Alternatively, or additionally, the completed application may be reformatted to a format desired by the customer, or otherwise desired by the developer.

According to a second aspect of the invention, multiple clients, whether Development Clients ("DC"'s) and/or Application Clients ("AC"'s) may access the same application at the same time for developing or running the application regardless of the actions of other clients with respect to the application. This function is accomplished through the use of common tables for both run and design modes as discussed above, and through a modified event driven update process to update the data and definition tables associated with the software application and copies of the software application.

In conventional database systems, data is commonly updated using an "only upon request" driven update process. An "only upon request" driven update process is one in which a client must send a request to obtain a data set from the server. Once the server receives a request, it sends the entire data set to the client to replace the entire data set previously retrieved by the client. The client receives no other updates until the client sends another request message to the server. To ensure that the client is continuously receiving current data the client may be set up to periodically send data requests to the server to update a database. In such a process, the transfer of the entire data set occurs whether or not there are any differences between the server data set and the client data set, and regardless of when any changes to the server data set are made. The "event driven" update process is more efficient than an "only upon request" update process because the server will actively update the client when an event occurs, such a change in the data that needs to be updated on the client. An event driven process may be further optimized by sending only the changed data to the client. It is believed that neither loop driven nor event driven client/server update processes have yet been applied to application development systems because with linear application development processes, there is not yet a need to update beyond the immediate application on the developer's computer.

According to embodiments of the present invention, and referring again to FIG. 3, visual control properties as well as all other information used to describe how the application will appear or behave are stored in "definition tables". Other information that is created or modified during application runtime or otherwise are stored in "data tables". The tables are associated with the application that they define. Both definition tables and data tables function and behave identically in their ability to store and transfer information between client and server applications and are distinguished only by the nature of the information they contain. Tables may be defined so that portions of the tables are locked to modifications by only those with authorization, or so that modifications to select portions of the tables remain local rather than global. Copies of local "preference" tables may remain resident in each client to allow customization of certain properties of the software application. Locked or lockable portions of the tables allow finalized portions of a particular software application to be locked to prevent accidental changes, or to limit modification to particular properties of the software application to specific developers. The ability to lock and divide portions of tables for functions is known in the art.

Figure 6:
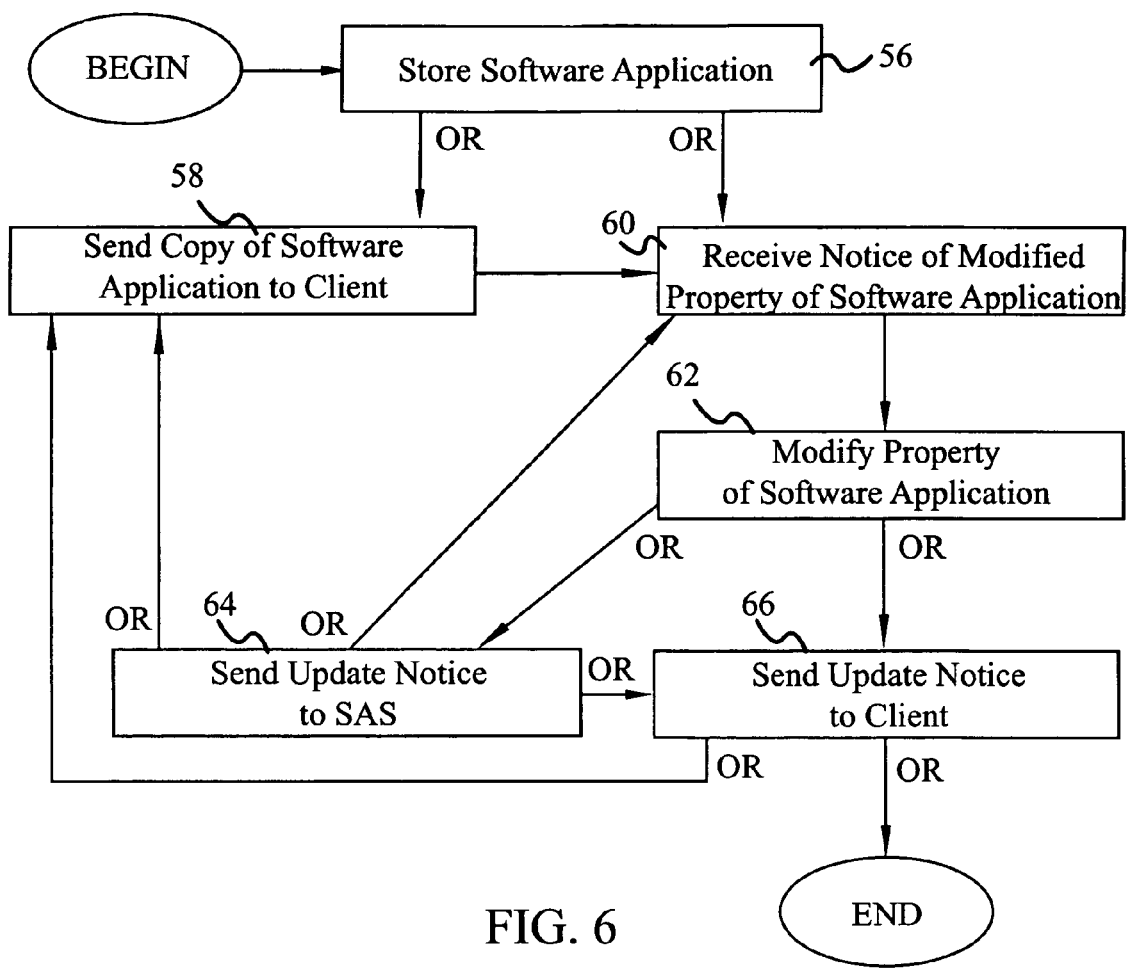
FIG. 6 is a flow chart of a method of developing software from the view of a software application server or application client according to an embodiment of the present invention.

In reference to FIG. 6, a SAS, or an AC functioning as a SAS, stores a software application or copy thereof (Step 56). The SAS may, upon request by a client, send a copy of the software application to the client (Step 58). When visual control properties, for example, are added or modified within a development environment by a DC 4, 6 or 8, the new properties for the visual controls are stored in a definition table associated with the copy of the software application running on the DC 4, 6 or 8. When any modification is made to any table associated with the software application copy running on any client, DC or AC, as explained previously, a property modification notice is sent from the client to the SAS. When the SAS receives the notice of the modified property (Step 60), it modifies the relevant property associated with the software application stored on the SAS to reflect the change made in a copy running on a client (Step 62). If the SAS is an AC functioning as a SAS, the AC then sends an update notice to its SAS (Step 64) so that the update may be propagated appropriately. The SAS then automatically sends an update notice to its clients (Step 66) who have a copy of the software application obtained from the SAS to reflect the same modifications in the corresponding table which was copied to each client. To accomplish this, the SAS maintains a list of every client that is currently running a copy of the software application stored on the SAS.

Thus, when any information is added or modified during runtime within the application by an AC or a DC, the new or modified information is reflected to the corresponding data tables on the SAS and then is further reflected by the SAS to all clients. In this way, each AC and DC will receive every change made by every other AC and DC immediately after the change event occurs. As used herein, "immediately" means executed at time zero and of a duration dependent upon the speeds at which the relevant processors and network communication lines can accomplish the task. In most cases, the changes are made within a fraction of a second and the delay is not noticed by an observer. Depending upon how many clients and client trees are associated with a particular SAS, the processor speed associated with the SAS, however, immediately may be up to 2 or 3 seconds or up to the amount of time required to propagate the updates to each client or server across the necessary network communication lines. As should be clear to those of ordinary skill in the art, because all updates to tables made by any client are immediately applied to all other clients using copies of the same tables, and because the run mode and design mode of the application use the same definition tables, multiple clients may simultaneously make changes to the same application through updates to a common SAS. Because all changes by any client to the tables are forwarded to the SAS and all other clients through update notices, every client maintains a current copy of the software application on the SAS. Any changes to the properties of the software application running on any client is also immediately reflected in the appearance and operation of the software application for all other clients.

Figure 7:
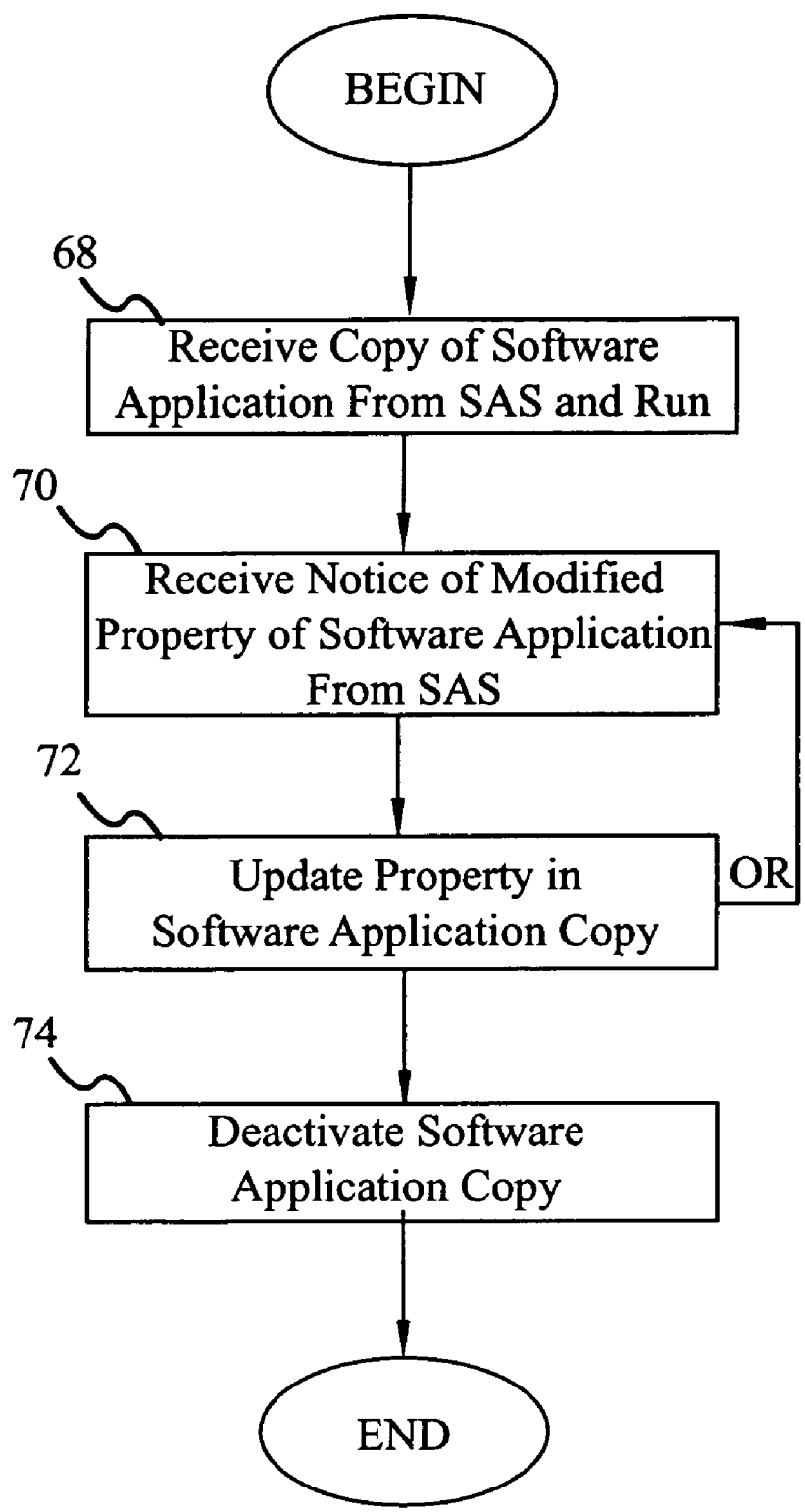
FIG. 7 is a flow chart of a method of developing software from the view of an application client according to an embodiment of the present invention.

FIG. 7 illustrates the operation of an AC in embodiments of the present invention. When an AC desires to run a particular software application, the AC requests and receives a copy of the software application from the SAS, and runs the application on the AC (Step 68). When the AC receives a notice of a modified property of the software application from the SAS, or from an ACC (Step 70), the AC updates the corresponding property in the copy of the software application (e.g. in the definition table or data table) (Step 72). The AC then continues running the software application, handling the update notices in a similar fashion while it runs the application, until the software application is terminated. At that point, similar to the embodiments described with respect to the DCs in reference to FIG. 4, the copy of the software application may be deactivated (Step 74) until the next time a user desires to run the same software application.

To further explain the functionality and advantages of the use of common tables in run mode and design mode, and the modified event driven updates of the invention, the following Example is given.

EXAMPLE 1

In a first particular example, a United States application development firm desires to develop a call center database entry system application for a customer in Japan and the customer needs a customized, fully operational application within a week. Ordinarily, this may not be long enough to completely design the application according to the parameters of the customer, program it, work out the bugs, and have this customer approve the application before it is due. This is because there are too many people which each need to take their turn at developing their portion of the application before the client in Japan gets it. Thus, regardless of the number of people who are available to work on the application, due to the linear nature of their involvement with the application, even with infinite resources, there is a limit on how fast the application can be completed.

Nevertheless, using a development environment configured according to the principles described in association with embodiments of the present invention above, this time may be significantly reduced because any number of developers, testers, and even the client may simultaneously develop, test, approve, view and run the same application and have immediate updates. In other words, if 10 developers were each established as Development Clients (DCs) for the application, 3 testers were each established as Application Clients (ACs) for the application, and a supervisor and the customer were each established as ACs for the application, all could simultaneously perform their respective roles relating to the final product.

On a conference call between all parties, the customer could explain its needs while the developers each performed their respective jobs with respect to the development of the application. A graphics designer could develop the graphics, a layout designer could develop the layout, a data designer could develop the required data associations, and other designers could develop functionality, animation, sound, and the like. The displays associated with each DC and AC would reflect the developments made by each other DC and AC, and the customer and testers could be running the application as it is being developed by the developers and making immediate comments on whether it looks and behaves as the customer planned. Thus, the developers, testers and customer may obtain immediate feedback from their work. If the customer has any changes to make, they may be made while the customer views the changes being made and sees the actual running program evolve into a polished application. No developer would be absolutely required to wait for another developer to finish. As will be clear to those of ordinary skill in the art, the network through which each of the ACs and DCs are associated with the servers may be any network including the Internet.

If, at some point in the future, the customer needs any modifications made to the software application, one or more developers may access the software application through a remote, or local, communication link to the customer's SAS, and begin modifying the customer's application. Because of the advantages of the invention discussed herein, the customer's call center may continue using the software application while the developers are modifying it or updating it. This is a significant advantage because the customer will not experience any down time due to upgrades or modifications to the software. Alternatively, the development application may be configured to allow a developer to make the necessary modifications to the software without a communication link to the customer's server, and merely forward an update notice to the software application server. The update notice would then cause all of the necessary modifications to occur simultaneously while the call center is still running the software. With the ability to upgrade software applications while clients are running the software application, there is no longer a need to reboot a server, cause all clients to disconnect from the software, or to perform upgrades in the early hours of the morning when no clients are active.

Just as each Development Client (DC) may load and develop the application of one Application Server (AS), the DC may load and develop any number of other applications associated with other Application Servers at the same time and toggle between them. One significant advantage of this ability is that visual controls or portions of one application may be copied or cut and pasted into, or linked to a second application easily. Thus, applications may be easily created and tested using portions of existing applications much like a word processing document may be created or modified by inserting portions from other word processing documents using simple commands.

As mentioned briefly above, another aspect of the invention is that any Development Client (DC) may act as a server to other clients (DCC) of the DC. In reference to FIG. 1, DC 6, because it contains a copy of the development environment from the Development Application Server (DAS) 2, may act as a DAS to its clients DCC 12 and 14, and in turn pass a copy of the development application to them. In which case, the DCC 12 and 14 will be operating as a DC to the DC 6 which is now operating as a DAS with respect to the DCC 12 and 14. Similarly, each Application Client (AC) 16, 18 and 20, for example AC 18, because it contains a copy of the application, may act as a SAS to its clients ACC 22, 24 and 26, and pass a copy of the application to them if requested. In which case, ACC 22, 24 and 26 will be operating as an AC to the AC 18 which is now operating as an SAS with respect to the ACC 22, 24 and 26. Likewise, rather than DCC 14 pointing directly to and accessing AS 10 for a copy of the application, there may be situations where it is more practical for DCC 14 to access ACC 22 acting as an AS for DCC 14. As should be clear to one of ordinary skill in the art from this explanation, an AC or DC (or ACC or DCC, etc.) may obtain a copy of the application from any SAS or AC, and the DC may obtain a copy of the development application from any DAS or DC. As should also be clear from the foregoing descriptions, there is no requirement that a SAS or DAS have a visual interface. In other words, a common server may be established without an interface to merely serve as a DAS and a SAS to all DC's and AC's.

A SAS also need not necessarily be running the application to act as an SAS so long as there is some application running which will coordinate the updates for the tables. In embodiments of the invention, each application includes functionality to automatically update the tables and send the appropriate notices to all clients as discussed above to coordinate the update process. Thus, while a running application will serve this update process if appropriately configured, a separate, simpler application may be given that functionality so that the larger application need not run.

Yet another unique aspect of the invention is that because an application may be running while it is being modified using the various principles of the invention, embodiments of the present invention are able to modify the development application environment through itself. In other words, a developer could add functionality and develop the development application through the development application. This is particularly useful where a developer desires to add functionality to an application, but the development application being used by the developer does not yet include the desired tools, or the developer does not like the particular arrangements of the tools. The developer need only point its running development application, whether it be operating through a DC, a DCC or at the DAS, at a copy of the development application to obtain a copy of the development application to modify, and begin developing. All modifications will be forwarded to the appropriate DAS and be made on the running development application while the developer is making the modifications. Because the visual control property definition tables, for example, for the run mode and the design mode are the same, the developer can develop its own development software using that development software to increase its usefulness. A separate development software is not necessarily needed.

Yet another application of the invention is in the use of software and data backup. Because the software application of embodiments of the invention may be configured to automatically update all application tables immediately for every client associated with a dynamic application, one or more AC's may therefore be added to the system for the sole purpose of running a backup application and or maintaining the data on the separate machine. This may be accomplished by maintaining a running copy of the software application on an client so that it is constantly updated with any changes. This backup feature is accomplished without any special backup software or environment. Additionally, a client may be configured to look for a secondary backup SAS in the case that the primary SAS is down or is not responding.

When a potentially large number of developers are modifying and changing the same application through the development environment, the possibility of two or more developers modifying the same element of the application, for example the "width" property of a text box, becomes not only probable, but likely. A priority algorithm may be used to ensure that discrepancies are not introduced between the AS's and the SAS. A priority algorithm may be configured, for example, to assign a random priority to each update that allows only one of the updates to dominate and the others to stop propagation if they conflict. The algorithm ensures that all client copies and the software application on the SAS are consistent with each other and contain the most recent information. Alternatively, priority could be determined by a heirarchy of authorization, or also by timing. Those of ordinary skill in the art will realize other methods of establishing priority among conflicting modifications by simultaneous developers from the description herein.

Yet another aspect of the invention involves the optimization of cell updates within any data table or definition table. Allowing simultaneous updates to different portions of a single cell by any number of users or developers adds a particularly unique addition to the invention. This can be done by using update messages between clients and servers that utilize sub-indexing into cells, which essentially specifies more precisely which part of the data within the cell has changed. Conventional database indexing uses a cell as the smallest index unit. By applying a subindexing method, a reduction is made in the number of potential conflicts resulting from more than one user or developer modifying the same table cell at the same time. Furthermore, by applying a cell subindexing method to the update processes for all types of files as discussed above, users are now able to simultaneously modify not only software applications, but new types of data. Examples of data which may be simultaneously modified by multiple users using embodiments of the invention include, without limitation, text streams, sound streams, movie streams, and the like, any data that could be termed by one of ordinary skill in the art as a "byte stream" or any data that would prove more useful if the method of sub-indexing where used on the cell containing the data. Using this along with the various other principles and embodiments of the present invention multiple users or developers are now able to simultaneously modify the same text documents, sounds, movies, graphics, or any other file or data which may be referenced or contained in a conventional table cell. The usefulness of this functionality will allow creators, designers, editors, proof readers or anyone else who may contribute to the final state of a product to do so simultaneously with all other users. In one specific embodiment, multiple users may edit a common text document simultaneously as a true joint effort rather than each working on separate portions of the document and forwarding revisions of the document back and forth.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A method of developing a software application, the method comprising:
    receiving a first copy of a software application from a software application server;
    running the first copy of the software application within a software application development environment to develop the software application;
    activating or deactivating at least one development switch within the development environment to enable modification of at least one property of the first copy of the software application;
    modifying the at least one property of the first copy of the software application;
    sending an update notice to the software application server to indicate the modification of the property; and
    deactivating or activating the at least one development switch within the development environment to demonstrate the modified property in the running software application.

2. The method of claim 1, further comprising receiving an update notice from the software application server and updating at least one property in at least one properties table associated with the at least one copy of the software application in response to the update notice.

3. The method of claim 2, wherein the update notice reflects a modification of a property in the properties table of a second copy of the software application while the first copy of the software application is running.

4. The method of claim 1, further comprising receiving and running a copy of a development application to establish the development environment.

5. The method of claim 1, wherein the software application is the development application.

6. The method of claim 1, further comprising storing the modified property in at least one properties table associated with the first copy of the software.

7. The method of claim 1, wherein the properties modified are visual control properties.

8. The method of claim 7, wherein the visual control properties are included in a visual control properties table to define the visual controls of the running first copy of the software application.

9. The method of claim 5, wherein the first copy of the software application is running on a client, further comprising deleting the copy of the software application from the client when the development environment is closed.

10. A method of developing a software application, the method comprising:
    receiving a first copy of a software application from a software application server;
    running the first copy of the software application within a software development environment to develop the software application;
    activating or deactivating at least one development switch within the development environment to enable modification of at least one property of the first copy of the software application;
    modifying the at least one property of the first copy of the software application within the development environment;
    storing the modified property in at least one properties table associated with the first copy of the software;
    testing the operation of the modified property of the first copy of the software application within the development environment by referencing the properties table associated with the first copy of the software.

11. The method of claim 10, wherein activating or deactivating the at least one development switch comprises activating or deactivating the Alt key on a keyboard.

12. The method of claim 10, further comprising:
    sending an update notice to the application server to indicate the modification to the property; and
    updating at least one property in the properties table in response to at least one update received from the application server resulting from a modification of a property in at least one properties table of a second copy of the software application while the first copy of the software application is running.

13. In a development application for creating software applications, a method for simultaneous development of a software application by two or more clients, the method comprising:
    running a first copy of a software application in conjunction with a first development application and a second copy of the software application in conjunction with a second development application;
    activating or deactivating at least a first development switch within the first development application to enable modification of at least a first property of the first copy of the software application and activating or deactivating at least a second development switch within the second development application to enable modification of at least a second property of the second copy of the software application;

modifying the first property of the first copy of the software application using the first development application and modifying the second property of the second copy of the software application using the second development application;

storing the modifications to the first property in at least a first property table associated with the first copy of the software application and storing the modifications to the second property in at least a second property table associated with the second copy of the software application;

updating the first property table with the modification made to the second property and updating the second property table with the modification made to the first property; and demonstrating the operation of the modified first and second properties within the first development application by referencing the first property table and demonstrating the modified first and second properties within the second development application by referencing the second property table.

14. The method of claim 13, wherein the first development application is associated with a first development client and the second development application is associated with a second development client.

15. The method of claim 13, wherein updating occurs substantially simultaneous with the modifications to the first and second properties.

16. The method of claim 13, wherein the software application is the development application.

17. A system for developing software applications, the system comprising:
at least one development application server (DAS) containing a development application;
at least one software application server (SAS) containing a software application; and
at least one development client (DC) associated with the DAS and the SAS;
wherein the DC is configured to receive a copy of the development application from the DAS and a copy of the software application from the SAS, to execute the copy of the development application and the copy of the software application, to activate or deactivate at least one development switch within the development application to enable modification of software application properties of the executed software application, to modify properties of the copy of the running software application, to provide update notices to the SAS for each modified property; and to deactivate or activate the at least one development switch within the development application to demonstrate the modified properties in the executed software application.

18. The system of claim 17, further comprising at least a second DC associated with a DAS and an SAS, wherein the at least a second DC is configured to receive a copy of the development application from its DAS and a copy of the software application from its SAS, to execute the copy of the development application and the copy of the software application, to modify properties of the copy of the running software application, and provide update notices to its SAS for each modified property.

19. The system of claim 18, wherein each SAS of the system which receives an update notice is configured to modify the properties of its software application and forward the update notice to each of its clients.

20. The system of claim 19, wherein the properties are stored in at least one property table and the property table is modified when an update notice is received.

21. The system of claim 17, further comprising a software application client (AC) associated with an SAS; wherein the AC is configured to receive a copy of the software application from the SAS, to execute the copy of the software application, and to update its properties when an update notice is received from the SAS.

22. The system of claim 21, wherein each client may run its copy of the software application and receive update notices from the SAS regardless of whether another client is running a copy of the software application.

23. The system of claim 18, wherein the software application is the development application.

24. The system of claim 21, wherein the AC is a backup for the application software.

25. The method of claim 1, wherein the software application development environment is a graphical development environment.

26. The method of claim 1, wherein sending an update notice to the software application server to indicate the modification of the property is done substantially simultaneously with the modification to the property being made.

27. The method of claim 10, wherein storing the modified property in the at least one properties table is done substantially simultaneously with modifying the at least one property.

28. The method of claim 13, wherein the development application is a graphical development application.

29. The system of claim 17, wherein the DC is a graphical based DC.

30. The system of claim 17, wherein the DC is further configured to provide the update notices to the SAS for each modified property substantially simultaneously with each property modification being made.

\* \* \* \* \*